(12) United States Patent
Lee et al.

(10) Patent No.: US 10,889,660 B2
(45) Date of Patent: Jan. 12, 2021

(54) EMULSIFYING INITIATOR, CORE-SHELL COPOLYMER, AND THERMOPLASTIC RESIN COMPOSITION COMPRISING SAME

(71) Applicant: LG Chem, Ltd., Seoul (KR)

(72) Inventors: Kwang Jin Lee, Daejeon (KR); Yoon Ho Kim, Daejeon (KR); Ki Hyun Yoo, Daejeon (KR); Chang No Lee, Daejeon (KR)

(73) Assignee: LG Chem, Ltd. (KR)

( * ) Notice: Subject to any disclaimer, the term of this patent is extended or adjusted under 35 U.S.C. 154(b) by 32 days.

(21) Appl. No.: 16/338,206

(22) PCT Filed: Jan. 29, 2018

(86) PCT No.: PCT/KR2018/001230
§ 371 (c)(1),
(2) Date: Mar. 29, 2019

(87) PCT Pub. No.: WO2018/236024
PCT Pub. Date: Dec. 27, 2018

(65) Prior Publication Data
US 2019/0233549 A1     Aug. 1, 2019

(30) Foreign Application Priority Data

Jun. 20, 2017   (KR) .................... 10-2017-0077749

(51) Int. Cl.
| | | |
|---|---|---|
| C08F 2/24 | (2006.01) |
| C08F 2/44 | (2006.01) |
| C08F 265/06 | (2006.01) |
| C08L 33/08 | (2006.01) |
| C08F 220/18 | (2006.01) |
| C08F 212/08 | (2006.01) |
| C08F 220/42 | (2006.01) |
| C08L 69/00 | (2006.01) |
| C08F 265/04 | (2006.01) |
| C08J 3/12 | (2006.01) |
| C08F 257/02 | (2006.01) |
| C08F 285/00 | (2006.01) |

(52) U.S. Cl.
CPC ............... *C08F 2/24* (2013.01); *C08F 2/44* (2013.01); *C08F 212/08* (2013.01); *C08F 220/18* (2013.01); *C08F 220/42* (2013.01); *C08F 257/02* (2013.01); *C08F 265/04* (2013.01); *C08F 265/06* (2013.01); *C08F 285/00* (2013.01); *C08J 3/12* (2013.01); *C08L 33/08* (2013.01); *C08L 69/00* (2013.01); *C08L 2207/53* (2013.01); *C08L 2312/00* (2013.01)

(58) Field of Classification Search
CPC .. C08F 2/24; C08F 2/44; C08F 212/08; C08F 220/18; C08F 220/42; C08F 257/02; C08F 265/04; C08F 265/06; C08F 285/00; C08F 265/104; C08F 220/14; C08F 220/1804; C08F 222/102; C08J 3/12; C08L 33/08; C08L 69/00; C08L 2312/00; C08L 51/04
USPC ........................................................ 523/201
See application file for complete search history.

(56) References Cited

U.S. PATENT DOCUMENTS

| | | | |
|---|---|---|---|
| 3,959,205 A | 5/1976 | Kobayashi et al. | |
| 2005/0059748 A1* | 3/2005 | Blankenship | C08J 3/05 521/50 |
| 2005/0119393 A1 | 6/2005 | Ahn et al. | |
| 2006/0074148 A1 | 4/2006 | Ahn et al. | |
| 2006/0089456 A1 | 4/2006 | Lee et al. | |
| 2019/0185605 A1* | 6/2019 | Nam | C08F 236/10 |

FOREIGN PATENT DOCUMENTS

| | | |
|---|---|---|
| CN | 1620471 A | 5/2005 |
| CN | 1622961 A | 6/2005 |
| CN | 104119460 A | 10/2014 |
| CN | 107890863 A | 4/2018 |
| DE | 2442121 A1 | 3/1976 |
| EP | 0433046 A2 | 6/1991 |
| EP | 1471080 A2 | 10/2004 |
| JP | S57034149 A | 2/1982 |
| JP | 2006500469 A | 1/2006 |
| KR | 20040057069 A | 7/2004 |
| KR | 20060036523 A | 5/2006 |
| KR | 20060105149 A | 10/2006 |
| KR | 20070008008 A | 1/2007 |
| KR | 100727235 B1 | 6/2007 |
| KR | 100870199 B1 | 11/2008 |
| KR | 20160039405 A | 4/2016 |

OTHER PUBLICATIONS

Extended European Search Report with Written Opinion for Application No. 18821368.0 dated Sep. 23, 2019, 6 pages.
Zaichenko, et al., "Kinetic features and molecular-weight characteristics of terpolymerization products of the systems based on vinyl acetate and 2-tert-butyl-peroxy-2-methyl-5-hexene-3-yne", Journal of Applied Polymer Science, Feb. 7, 1998, pp. 1061-1066, vol. 67, No. 6, XP055621310.
Search report from International Application No. PCT/KR2018/001230, dated May 3, 2018.

(Continued)

*Primary Examiner* — Hannah J Pak
(74) *Attorney, Agent, or Firm* — Lerner, David, Littenberg, Krumholz & Mentlik, LLP

(57) ABSTRACT

A core-shell copolymer includes a core including an emulsifying initiator-derived layer derived from an emulsifying initiator, and a core forming monomer-derived repeating unit, bound to the emulsifying initiator-derived layer; and a shell including a shell forming monomer-derived repeating unit, wherein the emulsifying initiator comprising a surfactant part, an initiator part, and a vinyl monomer-derived repeating unit, the surfactant part including an organic acid-based monomer-derived repeating unit, and the initiator part including a peroxide-based monomer-derived repeating unit, wherein the emulsifying initiator has a weight average molecular weight less than 250,000 g/mol.

12 Claims, 1 Drawing Sheet

(56) References Cited

OTHER PUBLICATIONS

Musyanovych, A., et al., "Hydroperoxide-containing Terpolymers as Inisurfs in Emulsion Polymerization of Styrene." Langmuir, 2003, vol. 19, No. 23, pp. 2619-9624.
Chemical Abstract compound, STN express. RN 101902-76-5 (Entered STN: May 4, 1986).
Adler, H.-J. P., et al., "New Core-Shell Dispersions with Reactive Groups." ACS Symposium Series, Nov. 6, 2001, vol. 801, pp. 276-292. See abstract.
Chinese Search Report for Application No. 201880003907.X dated Nov. 4, 2020, 3 pages.

\* cited by examiner

[FIG. 1]
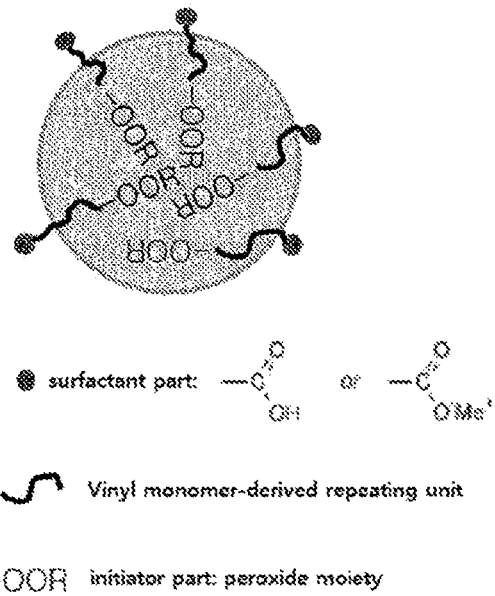
[FIG. 2]
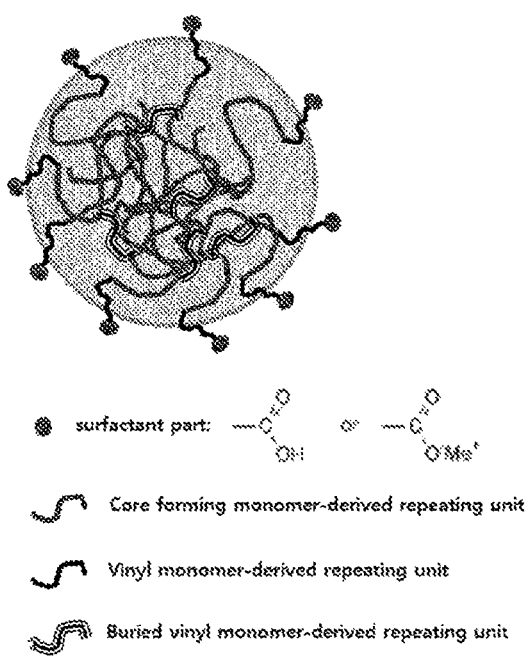

EMULSIFYING INITIATOR, CORE-SHELL COPOLYMER, AND THERMOPLASTIC RESIN COMPOSITION COMPRISING SAME

CROSS-REFERENCE TO RELATED APPLICATIONS

The present application is a national phase entry under U.S.C. § 371 of International Application No. PCT/KR2018/001230, filed on Jan. 29, 2018, which claims priority from Korean Patent Application No. 10-2017-0077749, filed on Jun. 20, 2017, the disclosures of which are incorporated herein in its entirety.

TECHNICAL FIELD

The present invention relates to an emulsifying initiator, a core-shell copolymer polymerized therefrom, and a thermoplastic resin composition including the core-shell copolymer.

BACKGROUND ART

A polycarbonate resin (hereinafter, referred to as PC resin) is known as a resin having excellent impact resistance, electrical properties and thermal resistance, and is being widely used as a resin for manufacturing a molded article used in electrical and electronic products including automobiles, and thus, the demand therefor is continuously increased. However, the PC resin has high melt viscosity, poor moldability, and very high thickness dependency of impact resistance, and is also poor in chemical resistance and hydrolytic stability.

Accordingly, when generally manufacturing a molded article using the PC resin, a PC/ABS alloy resin which is an alloy product with an acrylonitrile-butadiene-styrene resin (hereinafter, referred to as ABS resin) is used for complementing the high melt viscosity of PC resin, or PC/PBT alloy resin which is an alloy product with polybutylene terephthalate resin (hereinafter, referred to as PBT resin) is used for complementing the chemical resistance of PC resin, rather than using the PC resin alone. However, even in the case of using the PC/ABS resin or the PC/PBT alloy resin, the thickness dependency of impact resistance, a coloring property, and hydrolytic stability are still poor.

As a solution to these problems, in order to improve both of the impact resistance and the coloring property of the PC resin, it has been suggested that an acrylic resin is applied as an impact modifier, in addition to the PC/ABS alloy resin, or PC/PBT alloy resin. For example, Korean Patent Laid-Open Publication No. 2004-0057069 suggests an acrylic impact modifier having a multilayer structure, and discloses that in the case of using this in the PC resin, impact resistance and a coloring property may be improved. However, coloring property improvement is not enough to be applied to products, as compared with the effect of improving impact resistance, and hydrolytic stability still remains as an unsolved problem. In addition, Korean Patent Laid-Open Publication No. 2006-0036523 also suggests an acrylic impact modifier to which a silicon-based rubbery seed is applied, and discloses that when this is used in the PC resin, impact resistance and a coloring property may be improved, however, hydrolytic stability and thermal stability are poor.

In addition, the acrylic impact modifier is generally prepared by emulsion polymerization, and at the time of the emulsion polymerization, a polymerization initiator for initiating a radical polymerization reaction and a surfactant for polymerizing an acrylic monomer which is oil-soluble monomer in water are added, however, after completing polymerization, the polymerization initiator and the surfactant which are added during polymerization are not completely removed in the step of coagulating and drying the produced polymer latex, and remain on the dry powder of the polymer, and as a result, the remaining polymer initiator and surfactant decrease thermal stability when molding a resin, and also decrease the mechanical physical properties of the molded article.

DISCLOSURE

Technical Problem

The problems to be solved in the present invention is to minimize the contents of the remaining polymerization initiator and surfactant when preparing an acrylic impact modifier, and furthermore, to improve hydrolytic stability and thermal resistance, as well as impact resistance and a coloring property, when applying the prepared acrylic impact modifier to a polycarbonate resin.

That is, an object of the present invention is to provide an emulsifying initiator usable when preparing a core-shell copolymer, which is an acrylic impact modifier used with a polycarbonate resin, thereby minimizing the contents of the remaining polymerization initiator and surfactant, and further to include the prepared core-shell copolymer, thereby providing a thermoplastic resin composition having excellent impact resistance, coloring property, hydrolytic stability and thermal stability.

Technical Solution

In one general aspect, an emulsifying initiator includes a surfactant part, an initiator part and a vinyl monomer-derived repeating unit, the surfactant part including an organic acid-based monomer-derived repeating unit, and the initiator part including a peroxide-based monomer-derived repeating unit, wherein the content of the organic acid-based monomer-derived repeating unit is more than 2.5% by weight and less than 40% by weight, the content of the peroxide-based monomer-derived repeating unit is more than 2.5% by weight and less than 40% by weight, and the content of the vinyl monomer-derived repeating unit is more than 20% by weight and less than 95% by weight, based on a total content of the emulsifying initiator, and wherein the emulsifying initiator has a weight average molecular weight less than 250,000 g/mol.

In another general aspect, a core-shell copolymer includes a core including a layer derived from the emulsifying initiator, and a core forming monomer-derived repeating unit, bound to the emulsifying initiator-derived layer, and a shell including a shell forming monomer-derived repeating unit, wherein the content of the emulsifying initiator-derived layer is 2% by weight to 20% by weight, the content of the core forming monomer-derived repeating unit is 40% by weight to 88% by weight, and the shell forming monomer-derived repeating unit is 10% by weight to 40% by weight, based on a total content of the core-shell copolymer.

In another general aspect, a method of preparing a core-shell copolymer includes: i) polymerizing an organic acid-based monomer, a peroxide-based monomer and a vinyl monomer to prepare an emulsifying initiator having a weight average molecular weight less than 250,000 g/mol (S1); ii) reacting a core forming monomer in situ in the presence of the emulsifying initiator prepared in step (S1), thereby preparing a core polymer (S2); and iii) reacting a shell forming monomer in the presence of the core polymer prepared in step (S2), thereby preparing the core-shell copolymer (S3), wherein the contents of each monomer in step (S1) are as follows: more than 2.5% by weight and less than 40% by weight of the organic acid-based monomer, more than 2.5% by weight and less than 40% by weight of the peroxide-based monomer, and more than 20% by weight and less than 40% by weight of the vinyl monomer, based on a total content of the emulsifying initiator, and the contents of the emulsifying initiator, the core forming monomer and the shell forming monomer in steps (S2) and (S3) are as follows: 2% by weight to 20% by weight of the emulsifying initiator, 40% by weight to 88% by weight of the core forming monomer, and 10% by weight to 40% by weight of the shell forming monomer, based on a total content of the core-shell copolymer.

In still another general aspect, a thermoplastic resin composition includes the core-shell copolymer and a polycarbonate-based resin.

Advantageous Effects

When using the emulsifying initiator provided by the present invention in preparation of a core-shell copolymer, it is not necessary to add a polymerization initiator and a surfactant separately, thereby minimizing the content of the remaining polymerization initiator in the core-shell copolymer, and preventing the surfactant from remaining, and thus, a thermoplastic resin composition including the thus prepared core-shell copolymer has excellent impact resistance, coloring property, hydrolytic stability and thermal stability.

DESCRIPTION OF DRAWINGS

The above and other objects, features and advantages of the present invention will become apparent from the following description of preferred embodiments given in conjunction with the accompanying drawings, in which:

FIG. 1 is a schematic view representing the emulsifying initiator particles according to the present invention.

FIG. 2 is a schematic view representing the core polymer particles according to the present invention.

BEST MODE

The terms and words used in the description and claims of the present invention are to be construed not as a general or dictionary meaning, but as meaning and concepts meeting the technical ideas of the present invention, based on a principle that the inventors can appropriately define the concepts of terms in order to describe their own inventions in best mode.

Hereinafter, the present invention will be described in more detail for understanding the present invention.

The emulsifying initiator according to the present invention includes a surfactant part, an initiator part and a vinyl monomer-derived repeating unit, the surfactant part including an organic acid-based monomer-derived repeating unit, and the initiator part including a peroxide-based monomer-derived repeating unit, wherein the content of the organic acid-based monomer-derived repeating unit is more than 2.5% by weight and less than 40% by weight, the content of the peroxide-based monomer-derived repeating unit is more than 2.5% by weight and less than 40% by weight, and the content of the vinyl monomer-derived repeating unit is more than 20% by weight and less than 95% by weight, based on a total content of the emulsifying initiator, and wherein the emulsifying initiator has a weight average molecular weight less than 250,000 g/mol.

The emulsifying initiator (inisurf) according to the present invention is a copolymer, and may include both of a surfactant part serving as a surfactant in the copolymer, and an initiator part for initiating polymerization of the core of the core-shell copolymer, and thus, when polymerizing the core-shell copolymer, emulsion polymerization is possible without adding additional or separate polymerization initiator and surfactant.

According to an exemplary embodiment of the present invention, the surfactant part may be formed on the surface of emulsifying initiator particle (inisurf particle), and the initiator part may be formed inside the emulsifying initiator particle, and accordingly, through emulsion polymerization, the core is polymerized inside the emulsifying initiator, and the shell is polymerized on the polymerized core, thereby polymerizing the core-shell copolymer, without adding additional or separate polymerization initiator and surfactant. Furthermore, since the use of the emulsifying initiator according to the present invention allows the polymerization of the core inside the emulsifying initiator as described above, in situ polymerization is possible, in which after polymerizing the emulsifying initiator, the core is polymerized in the same reactor, and then even the shell is polymerized in the same reactor, and thus, after polymerization of the core polymer, a separate process of obtaining is not needed, and polymerization productivity is improved.

In addition, the emulsifying initiator according to the present invention which is a copolymer having the surfactant part and the initiator part connected to each other by a vinyl monomer-derived repeating unit, may serve as a 'seed' for polymerizing the core-shell copolymer. In the present invention, the term, 'seed' is for easily describing the emulsifying initiator-derived unit included in the core-shell copolymer as a part of the copolymer, and the meaning thereof is not limited to the seed for polymerization of a general core-shell copolymer like the form of polymerization in which the monomer forming the core is polymerized on the surface of the seed so that the core covers the seed, but also includes the seed for polymerization of the core-shell copolymer in which a monomer forming the core inside the emulsifying initiator swells, and then polymerization starts, and the core forms inside the emulsifying initiator, so that the seed covers the core, that is, in which the emulsifying initiator derived layer is formed on the exterior of the core.

The emulsifying initiator according to an exemplary embodiment of the present invention may be in the form of a particle in which the surfactant part and the initiator part are formed outside and inside the emulsifying initiator particle (inisurf particle), from the vinyl monomer-derived repeating unit, respectively, as shown in FIG. 1.

In the present invention, the term, "a monomer-derived repeating unit' may refer to a component, a structure or a material itself derived from a monomer, or the repeating unit formed in the polymer by the added monomer participating the polymerization reaction during polymerization.

In the present invention, the term "core" may refer to or a rubber polymer component, or a rubber component forming the core or core layer of the core-shell copolymer.

In the present invention, the term "shell" may refer to a copolymer component, or a polymer component forming a shell or shell layer by being graft-polymerized on the core of the core-shell copolymer.

Meanwhile, the organic acid-based monomer forming the organic acid-based monomer-derived repeating unit may be, as an example, an unsaturated carboxylic acid or an unsaturated carboxylic acid derivative including both a double bond for forming the repeating unit in the polymer, and the carboxylic acid group (—COOH) for forming the surfactant part in the polymer, and the unsaturated carboxylic acid or the unsaturated carboxylic acid derivative may be, as a specific example, the unsaturated carboxylic acid or the unsaturated carboxylic acid derivative having 3 to 25 carbon atoms, 3 to 20 carbon atoms, or 3 to 15 carbon atoms. The unsaturated carboxylic acid may have a plurality of, that is, two or more double bonds and carboxylic acid groups, respectively, within the range satisfying the number of carbon atoms, and may further include a functional group such as a hydroxyl group, in addition to the double bond and the carboxylic acid group, and the unsaturated carboxylic acid derivative may refer to an unsaturated carboxylic acid salt and an unsaturated carboxylic anhydride, derived from the unsaturated carboxylic acid. According to an exemplary embodiment of the present invention, the organic acid-based monomer may be an unsaturated carboxylic acid having 3 to 5 carbon atoms or an unsaturated carboxylic acid derivative having 3 to 5 carbon atoms, having excellent hydrophilicity, for improving a surfactant function of the surfactant part, and the specific example thereof may be an acrylic acid, a methacrylic acid, an itaconic acid or a maleic anhydride.

The content of the organic acid-based monomer-derived repeating unit may be equal to or more than 5% by weight and less than 40% by weight, 10% by weight to 35% by weight, or 20% by weight to 30% by weight, based on a total content of the emulsifying initiator, and within this range, the surfactant function is excellent, and the thermoplastic resin composition including the core-shell polymer polymerized using the emulsifying initiator has excellent thermal resistance and hydrolytic stability.

According to an exemplary embodiment of the present invention, the peroxide-based monomer forming the peroxide-based monomer-derived repeating unit may be, as an example, an unsaturated peroxide monomer including both a double bond for forming the repeating unit in the polymer and a peroxide group for forming the initiator part in the polymer. The unsaturated peroxide monomer may have a plurality of, that is, two or more double bonds, and further have a triple bond, in addition to the double bond.

According to an exemplary embodiment of the present invention, the peroxide-based monomer may be represented by the following Chemical Formula 1:

[Chemical Formula 1]

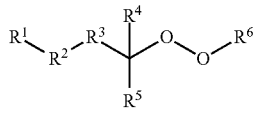

wherein $R^1$ is an alkenyl group having 2 to 10 carbon atoms, $R^2$ is an alkynylene group having 2 to 10 carbon atoms, $R^3$ is a single bond or an alkylene group having 1 to 10 carbon atoms, $R^4$ and $R^5$ are independently of each other an alkyl group having 1 to 30 carbon atoms, and $R^6$ is hydrogen or an alkyl group having 1 to 10 carbon atoms.

As a specific example, in Chemical Formula 1, $R^1$ may be an alkenyl group having 2 to 5 carbon atoms, $R^2$ may be an alkynylene group having 2 to 5 carbon atoms, $R^3$ may be a single bond or an alkylene group having 1 to 5 carbon atoms, $R^4$ and $R^5$ may be independently of each other an alkyl group having 1 to 10 carbon atoms, and $R^6$ may be hydrogen or an alkyl group having 1 to 8 carbon atoms.

As a more specific example, in Chemical Formula 1, $R^1$ may be an alkenyl group having 2 to 3 carbon atoms, $R^2$ may be an alkynylene group having 2 to 3 carbon atoms, $R^3$ may be a single bond or an alkylene group having 1 to 3 carbon atoms, $R^4$ and $R^5$ may be independently of each other an alkyl group having 1 to 5 carbon atoms, and $R^6$ may be hydrogen or an alkyl group having 1 to 5 carbon atoms.

According to an exemplary embodiment of the present invention, the peroxide monomer may be 2-tert-butylperoxy-2-methyl-5-hexene-3-yne, 5-hydroperoxy-5-methyl-1-hexene-3-yne, or a mixture thereof, and in this case, the polymerization initiation activity is excellent, and the thermoplastic resin composition including the core-shell polymer which is polymerized using the emulsifying initiator may have excellent thermal resistance and hydrolytic stability.

The content of the peroxide-based monomer-derived repeating unit may be equal to or more than 5% by weight and less than 40% by weight, 5% by weight to 30% by weight, or 10% by weight to 20% by weight, based on a total content of the emulsifying initiator, and within this range, the polymerization initiation activity is excellent, and the thermoplastic resin composition including the core-shell polymer polymerized using the emulsifying initiator has excellent thermal resistance and hydrolytic stability.

According to an exemplary embodiment of the present invention, the vinyl monomer forming the vinyl monomer-derived repeating unit may include a vinyl group which is a double bond for forming the repeating unit in the polymer. The vinyl monomer may be an aromatic vinyl monomer having a high refractive index for improving the coloring property of the polycarbonate resin having a high refractive index, and the aromatic vinyl monomer may be, as a specific example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl5-hexylnaphthalene.

The content of the vinyl monomer-derived repeating unit may be more than 20% by weight and equal to or less than 90% by weight, 35% by weight to 85% by weight, or 50% by weight to 70% by weight, based on a total content of the emulsifying initiator, and within this range, the thermoplastic resin composition including the core-shell polymer polymerized using the emulsifying initiator has excellent impact resistance and coloring property.

According to an exemplary embodiment of the present invention, the emulsifying initiator may be a copolymer represented by the following Chemical Formula 2:

[Chemical Formula 2]

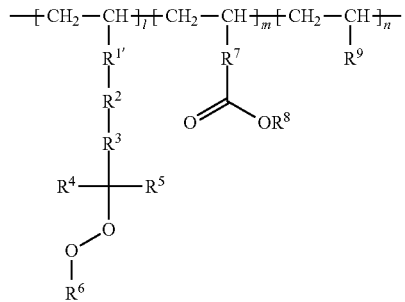

wherein $R^{1'}$ is a single bond or an alkylene group having 1 to 8 carbon atoms, $R^2$ is an alkynylene group having 2 to 10 carbon atoms, $R^3$ and $R^7$ are independently of each other a single bond or an alkylene group having 1 to 10 carbon atoms, $R^4$ and $R^5$ are independently of each other an alkyl group having 1 to 30 carbon atoms, $R^6$ and $R^8$ are independently of each other hydrogen or an alkyl group having 1 to 10 carbon atoms, and $R^9$ is an aryl group having 5 to 30 carbon atoms, an alkylaryl group having 6 to 30 carbon atoms, or a heteroaryl group having 3 to 30 carbon atoms.

As a specific example, in Chemical Formula 2, $R^{1'}$ may be a single bond or an alkylene group having 1 to 3 carbon atoms, $R^2$ may be an alkynylene group having 2 to 5 carbon atoms, $R^3$ and $R^7$ may be independently of each other a single bond or an alkylene group having 1 to 5 carbon atoms, $R^4$ and $R^5$ may be independently of each other an alkyl group having 1 to 10 carbon atoms, $R^6$ and $R^8$ may be independently of each other hydrogen or an alkyl group having 1 to 8 carbon atoms, and $R^9$ may be an aryl group having 5 to 20 carbon atoms, an alkylaryl group having 6 to 20 carbon atoms, or a heteroaryl group having 3 to 20 carbon atoms.

As a more specific example, in Chemical Formula 2, $R^{1'}$ may be a single bond or an alkylene group having 1 to 1 carbon atoms, $R^2$ may be an alkynylene group having 2 to 3 carbon atoms, $R^3$ and $R^7$ may be independently of each other a single bond or an alkylene group having 1 to 3 carbon atoms, $R^4$ and $R^5$ may be independently of each other an alkyl group having 1 to 5 carbon atoms, $R^6$ and $R^8$ may be independently of each other hydrogen or an alkyl group having 1 to 5 carbon atoms, and $R^9$ may be an aryl group having 5 to 12 carbon atoms, an alkylaryl group having 6 to 10 carbon atoms, or a heteroaryl group having 3 to 10 carbon atoms.

In addition, in Chemical Formula 2, 1, m and n may be independently of each other an integer selected from 1 to 100,000, within the range satisfying the contents of the repeating units derived from each monomer of the emulsifying initiator.

Meanwhile, the emulsifying initiator represented by Chemical Formula 2 is a copolymer including each repeating unit which is repeated by the number of 1, m and n, and for convenience of description, 1 repeating units, m repeating units and n repeating units are described in order, however, by this description, the form of the emulsifying initiator represented by Chemical Formula 2 is not limited to the form of a block copolymer in which 1 repeating units, m repeating units and n repeating units form blocks in order, respectively, but also may include the form of a random copolymer in which 1 repeating units, m repeating units and n repeating units are randomly distributed, respectively, in the copolymer.

As a specific example, the 1 repeating units may be the peroxide-based monomer-derived repeating units included in the initiator part, the m repeating units may be the organic acid-based monomer-derived repeating units in the surfactant part, and the n repeating units may be the vinyl monomer-derived repeating units.

According to an exemplary embodiment of the present invention, the emulsifying initiator may have a weight average molecular weight of 5,000 g/mol to 200,000 g/mol, 5,000 g/mol to 150,000 g/mol, or 10,000 to 100,000 g/mol, and within this range, the preparation by emulsion polymerization is easy, the polymerization initiation activity as a polymerization initiator is excellent, and the surfactant function as the surfactant is excellent.

As another example, the emulsifying initiator may have a critical micelle concentration (CMC) of 0.1 g/L to 30 g/L, 1.0 g/L to 25 g/L, more than 2.0 g/L and less than 24 g/L, or 5 g/L to 20 g/L, and within this range, the surfactant function as the surfactant is excellent.

The core-shell copolymer according to the present invention includes an _emulsifying initiator-derived layer which is a layer derived from the _emulsifying initiator, a core including the core forming monomer-derived repeating unit bound to the _emulsifying initiator-derived layer, and a shell including a shell forming monomer-derived repeating unit, wherein the content of the _emulsifying initiator-derived layer is 2% by weight to 20% by weight, the content of the core forming monomer-derived repeating unit is 40% by weight to 88% by weight, and the shell forming monomer-derived repeating unit is 10% by weight to 40% by weight, based on a total content of the core-shell copolymer.

The core-shell copolymer may be a graft copolymer in which the shell forming monomer-derived repeating unit is graft polymerized on the core, or an acrylic impact modifier used with a polycarbonate resin.

In the present invention, the 'emulsifying initiator derived layer' may include both of the _emulsifying initiator-derived layer in which when polymerizing a core using the emulsifying initiator according to the present invention, a monomer forming the core is polymerized on the surface of the emulsifying initiator to cover the emulsifying initiator, and the emulsifying initiator-derived layer in which after a monomer forming the core inside the emulsifying initiator swells, polymerization is initiated, and the core is formed inside the emulsifying initiator, so that the emulsifying initiator covers the core. In addition, in the case of the polymerization in which the emulsifying initiator covers the core, polymerization may be performed not only in the form that the emulsifying initiator-derived layer covers the entire core, but also in the form that the outermost portion of the core and the emulsifying initiator-derived layer form the surface of the core partially with respect to each other. That is, the emulsifying initiator-derived layer is for representing the emulsifying initiator-derived unit included in the core-shell copolymer, and may be present in a mixed state on the outside or inside of the core.

The core of the core-shell copolymer according to an exemplary embodiment of the present invention may be in the form of a particle obtained by initiating polymerization by the initiator inside the emulsifying initiator particle after the core-forming monomer swells inside the emulsifying initiator represented in FIG. 1, thereby including the emulsifying initiator-derived layer, as shown in FIG. 2, and polymerizing the core forming monomer by the initiator part of the emulsifying initiator.

According to an exemplary embodiment of the present invention, the content of the emulsifying initiator-derived layer may be 5% by weight to 20% by weight, 5% by weight to 15% by weight, or 8% by weight to 12% by weight, based on a total content of the core-shell copolymer, and within this range, the thermoplastic resin composition including the core-shell polymer may have excellent impact resistance, coloring property, thermal resistance and hydrolytic stability, and also have excellent balance between physical properties.

In the core-shell copolymer of the present invention, the core is for improving impact resistance when mixed with a polycarbonate resin, and may be an acrylate rubbery core, and the core forming monomer according to an exemplary embodiment of the present invention may include an alkyl (meth)acrylate monomer and a crosslikable monomer.

The alkyl (meth)acrylate monomer is the core forming monomer for forming an acrylic core, and may be an alkyl (meth)acrylate monomer having 2 to 12 carbon atoms. Herein, the alkyl group having 2 to 12 carbon atoms may include both of the linear alkyl group having 2 to 12 carbon atoms, and the branched alkyl group having 3 to 12 carbon atoms. As a specific example, the alkyl (meth)acrylate monomer may be ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, decyl (meth)acrylate, undecyl (meth)acrylate and dodecyl (meth) acrylate. As another example, the alkyl (meth)acrylate monomer may be an alkyl (meth)acrylate monomer containing an alkyl group having 2 to 8 carbon atoms. Herein, the alkyl (meth)acrylate monomer may refer to alkyl acrylate or alkyl methacrylate. In addition, the alkyl (meth)acrylate monomer may be a mixture of two or more alkyl (meth) acrylate having different alkyl groups.

The crosslinkable monomer is a comonomer for easily carrying out polymerization at the time of core polymerization, and may be one or more selected from (meth)acrylic crosslinkable monomers such as ethyleneglycol di(meth)acrylate, 1,6-hexandiol di(meth)acrylate, allyl (meth)acrylate, trimethylolpropane tri(meth)acrylate and pentaerythritol tetra(meth)acrylate; and vinyl-based crosslinkable monomers such as divinyl benzene, divinylnaphthalene and diallylphthalate.

According to an exemplary embodiment of the present invention, the content of the alkyl (meth)acrylate monomer may be 95% by weight to 99.9% by weight, 97% by weight to 99.9% by weight, or 98.5% by weight to 99.9% by weight, based on a total content of the core forming monomer, and the content of the crosslinkable monomer may be 0.1% by weight to 5% by weight, 0.1% by weight to 3% by weight, or 0.1% by weight to 1.5% by weight, based on a total content of the core forming monomer. Within these ranges, the polymerization productivity is excellent, and the thermoplastic resin composition including the core-shell polymer has excellent impact resistance.

In addition, according to an exemplary embodiment of the present invention, the content of the core forming monomer-derived repeating unit may be 40% by weight to 80% by weight, 50% by weight to 75% by weight, or 60% by weight to 70% by weight, based on a total content of the core-shell copolymer, and within this range, the thermoplastic resin composition including the core-shell polymer may have excellent impact resistance, coloring property and thermal resistance.

In the core-shell copolymer of the present invention, the shell is for improving dispersibility to a matrix resin, when mixing with a polycarbonate resin, and the shell forming monomer according to an exemplary embodiment of the present invention may include two or more monomers selected from the group consisting of an alkyl (meth)acrylate monomer, an aromatic vinyl monomer and a vinyl cyano monomer; and a crosslinkable monomer.

As a specific example, the shell forming monomer may include two or more of alkyl (meth)acrylate monomers and a crosslinkable monomer; or an aromatic vinyl monomer, a vinyl cyano monomer and a crosslinkable monomer.

As a more specific example, when the shell forming monomer includes two or more of alkyl (meth)acrylate monomers and a crosslinkable monomer, the two or more of alkyl (meth)acrylate monomers may include methyl (meth)acrylate, and one or more alkyl (meth)acrylate containing an alkyl group having 2 to 12 carbon atoms. Herein, the alkyl group having 2 to 12 carbon atoms may include both the linear alkyl group having 2 to 12 carbon atoms, and the branched alkyl group having 3 to 12 carbon atoms. As a specific example, the alkyl (meth)acrylate monomer having 2 to 12 carbon atoms may be ethyl (meth)acrylate, propyl (meth)acrylate, butyl (meth)acrylate, pentyl (meth)acrylate, hexyl (meth)acrylate, heptyl (meth)acrylate, octyl (meth) acrylate, 2-ethylhexyl (meth)acrylate, nonyl (meth)acrylate, decyl (meth)acrylate, undecyl (meth)acrylate and dodecyl (meth)acrylate. Herein, the alkyl (meth)acrylate monomer may refer to alkyl acrylate or alkyl methacrylate.

As another example, when the shell forming monomer includes an aromatic vinyl monomer, a vinyl cyano monomer and a crosslinkable monomer, the aromatic vinyl monomer may be one or more selected from the group consisting of styrene, α-methylstyrene, 3-methylsthrene, 4-methylstyrene, 4-propylstyrene, 1-vinylnaphthalene, 4-cyclohexylstyrene, 4-(p-methylphenyl)styrene and 1-vinyl-5-hexylnaphthalene, and the vinyl cyano monomer may be one or more selected from the group consisting of acrylonitrile, methacrylonitrile and ethacrylonitrile.

The crosslinkable monomer is a comonomer for easily carrying out graft polymerization at the time of shell polymerization, and may be a crosslinkable monomer which is identical to or different from the crosslinkable monomer included in the core forming monomer. As a specific example, it may be one or more selected from (meth)acrylic crosslinkable monomers such as ethyleneglycol di(meth)acrylate, 1,6-hexandiol di(meth)acrylate, allyl (meth)acrylate, trimethylolpropane tri(meth)acrylate and pentaerythritol tetra(meth)acrylate; and vinyl-based crosslinkable monomers such as divinyl benzene, divinylnaphthalene and diallylphthalate.

According to an exemplary embodiment of the present invention, when the shell forming monomer includes two or more alkyl (meth)acrylate monomers and a crosslinkable monomer, the content of the methyl (meth)acrylate monomer may be 68.5% by weight to 99.8% by weight, 70% by weight to 95% by weight, or 80% by weight to 95% by weight, based on a total content of the shell forming monomer, the content of the alkyl (meth)acrylate monomer having 2 to 12 carbon atoms may be 0.1% by weight to 30% by weight, 1% by weight to 20% by weight, or 5% by weight to 15% by weight, based on a total content of the shell forming monomer, and the content of the crosslinkable monomer may be 0.1% by weight to 1.5% by weight, 0.1% by weight to 1.0% by weight, or 0.3% by weight or 0.8% by weight, based on a total content of the shell forming monomer. Within these ranges, the thermoplastic resin composition including the core-shell polymer has excellent impact resistance, coloring property and thermal resistance.

In addition, according to an exemplary embodiment of the present invention, when the shell forming monomer includes an aromatic vinyl monomer, a vinyl cyano monomer and a crosslinkable monomer, the content of the aromatic vinyl monomer may be 30% by weight to 90% by weight, 50% by weight to 90% by weight, or 60% by weight to 85% by weight, based on a total content of the shell forming monomer, the content of the vinyl cyano monomer may be 9.9% by weight to 69.9% by weight, 9.9% by weight to 49.9% by weight, or 14.7% by weight to 39.7% by weight, based on a total content of the shell forming monomer, and the content of the crosslinkable monomer may be 0.1% by weight to 1.5% by weight, 0.1% by weight to 1.0% by weight, or 0.3% by weight or 0.8% by weight, based on a total content of the shell forming monomer. Within these ranges, the thermoplastic resin composition including the core-shell polymer has excellent impact resistance, coloring property and thermal resistance.

In addition, according to an exemplary embodiment of the present invention, the content of the shell forming monomer-derived repeating unit may be 15% by weight to 40% by weight, 20% by weight to 35% by weight, or 22% by weight to 28% by weight, based on a total content of the core-shell copolymer, and within this range, the thermoplastic resin composition including the core-shell polymer has excellent impact resistance, coloring property and thermal resistance.

The method of preparing a core-shell copolymer the present invention includes: i) polymerizing an organic acid-based monomer, a peroxide-based monomer and a vinyl monomer to prepare an emulsifying initiator having a weight average molecular weight less than 250,000 g/mol (S1); ii) reacting a core forming monomer in situ in the presence of the emulsifying initiator prepared in step (S1), thereby preparing a core polymer (S2); and iii) reacting a shell forming monomer in the presence of the core polymer prepared in step (S2), thereby preparing the core-shell copolymer (S3), wherein the contents of each monomer in step (S1) are as follows: more than 2.5% by weight and less than 40% by weight of the organic acid-based monomer, more than 2.5% by weight and less than 40% by weight of the peroxide-based monomer, and more than 20% by weight and less than 40% by weight of the vinyl monomer, based on a total content of the emulsifying initiator, and the contents of the emulsifying initiator, the core forming monomer and the shell forming monomer in steps (S2) and (S3) are as follows: 2% by weight to 20% by weight of the emulsifying initiator, 40% by weight to 88% by weight of the core forming monomer, and 10% by weight to 40% by weight of the shell forming monomer, based on a total content of the core-shell copolymer.

Step (S1) is to prepare the emulsifying initiator according to the present invention, which may be prepared by radical polymerization using a molecular weight modifier and a polymerization initiator, in the presence of an organic acid-based monomer, a peroxide-based monomer and a vinyl monomer, and may be practiced by an emulsion polymerization method. The molecular weight modifier may be, as an example, n-butylmercaptan, n-octylmercaptan, n-dodecylmercaptan, t-dodecylmercaptan, and the like, and the polymerization initiator may be a water-soluble polymerization initiator, and as a specific example, one or more selected from the group consisting of potassium persulfate, ammonium persulfate and hydrogen peroxide. Further, step (S1) may be carried out at 30° C. to 65° C., or 50° C. to 65° C.

Step (S2) is to prepare the core of the core-shell copolymer, and is characterized in that a core forming monomer is polymerized in situ in the presence of the emulsifying initiator prepared in (S1), thereby preparing a core polymer. That is, the method of preparing a core-shell copolymer according to the present invention may prepare a core by emulsion polymerization only with the emulsifying initiator without adding separate polymerization initiator and surfactant, unlike the common emulsion polymerization method of a core which essentially involves addition of separate polymerization initiator and surfactant, when preparing the core. Thus, when preparing the core-shell copolymer, the added amounts of the polymerization initiator and the surfactant are significantly decreased, and thus, the contents of the polymerization initiator and the surfactant remaining on the dry powder of the core-shell copolymer are significantly decreased, thereby improving the impact resistance and the thermal resistance of the thermoplastic resin composition including the core-shell polymer prepared by the present invention, and allowing an in-situ reaction which polymerizes the core directly on the emulsifying initiator. Accordingly, the steps of preparing and obtaining a seed polymer are unnecessary, and polymerization productivity is improved.

The polymerization method in step (S2) may be carried out by an emulsion polymerization method. Step (S2) may be carried out at 70° C. to 150° C., or 70 OC to 130° C.

Step (S3) is to polymerize the shell of the core-shell copolymer, and is characterized in that a shell forming monomer is graft polymerized in the presence of the core polymer prepared in step (S2), thereby preparing a core-shell copolymer. Meanwhile, in step (S3) also, the shell forming monomer may be graft polymerized in situ in the presence of the core polymer prepared in step (S2), thereby making the step of obtaining the core polymer unnecessary to improve polymerization productivity.

Step (S3) may be carried out by an emulsion polymerization method. Step (S3) may be carried out at 70° C. to 150° C., or 70° C. to 130° C.

According to an exemplary embodiment of the present invention, the method of preparing a core-shell copolymer may include the steps of agglomeration, aging, dehydration and drying, respectively, in order to obtain core-shell copolymer latex obtained by emulsion polymerization in a powder form. The core-shell copolymer powder obtained by the above steps may serve as an impact modifier in the thermoplastic resin composition.

According to an exemplary embodiment of the present invention, the step of agglomeration may be carried out by adding one or more coagulants selected from the group consisting of magnesium sulfate, potassium chloride, aluminum sulfate, sulfuric acid, phosphoric acid and hydrochloric acid to the core-shell copolymer latex. When the step of aging is carried out after the step of agglomeration, residual monomers which does not participate the polymerization by volatilization may be removed. The steps of dehydration and drying may be carried out in a manner of hot air drying, after removing moisture from the agglomerated and/or aged copolymer composition latex by a dehydrator to separate it as a solid content, and in this case, the drying time may be shortened by dehydration, and the residual monomer which does not participate the polymerization may be removed by hot air drying.

The thermoplastic resin composition according to the present invention may include the core-shell copolymer and the polycarbonate-based resin. The thermoplastic resin composition may include, as an example, the core-shell copolymer as an impact modifier.

According to an exemplary embodiment of the present invention, the polycarbonate-based resin may be a polycarbonate-based resin in which a bisphenol-based monomer and a carbonate precursor are copolymerized. An example of the bisphenol-based monomer may be, as an example, one or more selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl) sulfide, bis (4-hydroxyphenyl) ketone, 1,1-bis(4-hydroxyphenyl)ethane, 2,2-bis (4-hydroxyphenyl) propane (bisphenol A; BPA), 2,2-bis(4-hydroxyphenyl)butane, 1,1-bis(4-hydroxyphenyl)cyclohexane (bisphenol Z; BPZ), 2,2-bis(4-hydroxy-3,5-dibromophenyl)propane, 2,2-bis(4-hydroxy-3,5-dichlororophenyl)propane, 2,2-bis(4-hydroxy-3-bromophenyl)propane, 2,2-bis(4-hydroxy-3-chlorophenyl)propane, 2,2-bis(4-hydroxy-3-methylphenyl) propane, 2,2-bis(4-hydroxy-3,5-dimethylphenyl)propane, 1,1-bis (4-hydroxyphenyl)-1-phenylethane, bis(4-hydroxylphenyl)diphenylmethane and α,ω-bis[3-(o-hydroxyphenyl)propyl]polydimethylsilioxane. An example of the carbonate precursor may by one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, bis(diphenyl) carbonate, carbonyl chloride (phosgene), triphosgene, diphosgene, carbonyl bromide and bishaloformate.

According to an exemplary embodiment of the present invention, the content of the core-shell copolymer may be 0.1% by weight to 50% by weight, 0.1% by weight to 30% by weight, or 0.1% by weight to 20% by weight, based on a total content of the thermoplastic resin composition, and the content of the polycarbonate-based resin may be 50% by weight to 99.9% by weight, 70% by weight to 99.9% by weight, or 80% by weight to 99.9% by weight, based on a total content of the thermoplastic resin composition. Within these ranges, the thermoplastic resin composition has excellent impact resistance, coloring property, thermal resistance and hydrolytic stability.

As another example, the thermoplastic resin composition may further include one or more additives selected from the group consisting of heat stabilizers, antioxidants, light stabilizers, pigments, dyes, antistatic agents, antimicrobial agents, metal deactivators, flame retardants, and fluorine-based anti-dripping agents, within the range not affecting the physical properties, in addition to the core-shell copolymer and the polycarbonate-based resin.

The thermoplastic resin composition according to the present invention may have impact strength at −30° C. of 10 kgf·cm/cm to 20 kgf·cm/cm, 12 kgf·cm/cm to 18 kgf·cm/cm, or 14 kgf·cm/cm to 16 kgf·cm/cm, and impact strength at room temperature (15° C. to 25° C.) of 50 kgf·cm/cm or more, 50 kgf·cm/cm to 100 kgf·cm/cm, or 60 kgf·cm/cm to 80 kgf·cm/cm, for a specimen having a thickness of ⅛", as measured according to ASTM D256, Method A.

In addition, the thermoplastic resin composition according to the present invention may have an impact strength variation of 20 kgf·cm/cm or less, 5 kgf·cm/cm to 20 kgf·cm/cm, or 10 kgf·cm/cm to 15 kgf·cm/cm, wherein the impact strength variation (=impact strength after aging—impact strength before aging) is measured at room temperature (15° C. to 25° C.) according to ASTM D256, Method A, after aging a specimen having a thickness of ⅛" for 500 hours in a constant temperature and humidity chamber under the condition of internal temperature of 90° C. and relative humidity of 95%.

In addition, the thermoplastic resin composition according to the present invention may have a yellow index (YI) variation of 20 or less, 10 to 20, or 10 to 15, wherein the yellow index variation (=yellow index after aging—yellow index before aging) is measured at room temperature (15° C. to 25° C.) according to ASTM D256, Method A, after aging a specimen having a thickness of ⅛" for 500 hours in a constant temperature and humidity chamber under the condition of internal temperature of 90° C. and relative humidity of 95%.

In addition, the thermoplastic resin composition according to the present invention may have a yellow index variation of 20 or less, 0.1 to 15, or 1 to 10, wherein the yellow index (=yellow index of the specimen before staying—yellow index of the specimen after staying for 10 minutes) is measured using an EC100 (30 injection machine available from ENGEL after allowing the specimen to stay at 330° C. for 10 minutes.

In addition, the thermoplastic resin composition according to the present invention may have ΔE of 10 or less, 0.1 to 10, or 5 to 8, wherein ΔE $(=[\Delta L^*_2+\Delta a^{*2}+\Delta b^*_2]_{1/2})$ is measured by measuring a CIE lab color value using a spectrophotometer, Color-eye 3100, and reflecting the difference of color value, based on a CIE lab value of the comparative specimen.

Hereinafter, the present invention will be described in detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Example 1

<Preparation of Emulsifying Initiator>

To a four-necked flask equipped with a stirrer, a thermometer, a nitrogen inlet and a circulation condenser, 190 parts by weight of ion exchange water was added, and the internal temperature of the reactor was raised to 60° C. and maintained at this temperature under the nitrogen atmosphere. After the internal temperature of the reactor reached 60° C., 7 parts by weight of styrene, 2 parts by weight of acrylic acid, 1 part by weight of 2-t-butylperoxy-2-methyl-5-hexene-3-yne, 0.05 parts by weight of t-dodecylmercaptan as a molecular weight modifier, and 0.1 parts by weight of potassium persulfate (KPS) as a water-soluble polymerization initiator were added all together to proceed with the reaction. After aging for 3 hours, the reaction was completed to prepare an emulsifying initiator latex, with a polymerization conversion rate of 96%.

<Preparation of Core>

After preparing the emulsifying initiator latex, the internal temperature of the reactor was raised to 75° C. and maintained at this temperature. After the internal temperature of the reactor reached 75° C., a core forming monomer mixture of 49.35 parts by weight of butyl acrylate, 15 parts by weight of 2-ethylhexyl acrylate, and 0.65 parts by weight of allyl methacrylate was continuously added for 3 hours to proceed with the reaction. After completing the addition of the core forming monomer mixture, and aging for 2 hours, the reaction was completed to prepare core latex, with a polymerization conversion rate of 98%, and the core particles had an average particle diameter of 225 nm.

<Preparation of Core-Shell Copolymer>

After preparing the core latex, the internal temperature of the reactor was raised to 75° C. and maintained at this temperature. Subsequently, a shell forming monomer mixture of 22.3 parts by weight of methyl methacrylate, 2.5 parts by weight of butyl acrylate, and 0.2 parts by weight of ethylene glycol dimethacrylate was continuously added for 2 hours to proceed with the reaction. After completing the addition of the shell forming monomer mixture, and aging for 1 hour and 30 minutes, the reaction was completed to prepare core-shell copolymer latex, with a polymerization conversion rate of 99%, and the core-shell copolymer particles had an average particle diameter of 245 nm.

The average particle diameter of the core particles and the core-shell copolymer particles was measured by preparing 1 g of the prepared core latex and the core-shell copolymer latex, and measuring the average particle diameter (D50) of the core particles and the core-shell copolymer particles dispersed in the core latex and the core-shell copolymer latex under the condition of room temperature, through a laser light scattering method, using a Nicomp 380 apparatus.

<Preparation of Core-Shell Copolymer Powder>

To the obtained core-shell copolymer latex, 1 part by weight of an aqueous magnesium sulfate solution (at a concentration of 1%) based on 100 parts by weight of core-shell copolymer solid content was added all together as a coagulant to perform agglomeration, thereby obtaining slurry, which was washed with ion exchange water three times to wash off the byproduct, and filtration was performed to remove the washing water. Subsequently, drying was performed at 80° C. for 2 hours using a fluidized-bed dryer to obtain core-shell copolymer powder.

Example 2

The process was performed in the same manner as in Example 1, except that in the preparation of the emulsifying initiator, 6.5 parts by weight of styrene, 2 parts by weight of acrylic acid, and 1.5 parts by weight of 2-t-butylperoxy-2-methyl-5-hexene-3-yne were added.

Example 3

The process was performed in the same manner as in Example 1, except that in the preparation of the core-shell copolymer, instead of methyl methacrylate and butyl acrylate, 19.8 parts by weight of styrene, and 5.0 parts by weight of acrylonitrile were added.

Example 4

The process was performed in the same manner as in Example 1, except that in the preparation of the emulsifying initiator, 5 parts by weight of styrene, 3 parts by weight of acrylic acid, 2 parts by weight of 2-t-butylperoxy-2-methyl-5-hexene-3-yne were added.

Comparative Example 1

<Preparation of Polystyrene Seed>
To a four-necked flask equipped with a stirrer, a thermometer, a nitrogen inlet and a circulation condenser, 190 parts by weight of ion exchange water was added, and the internal temperature of the reactor was raised to 70° C. and maintained at this temperature under the nitrogen atmosphere. After the internal temperature of the reactor reached 70° C., 10 parts by weight of styrene, 0.5 parts by weight of a fatty acid soap as a surfactant, 0.5 parts by weight of sodium hydrogen carbonate (NaHCO₃) as an electrolyte, and 0.1 parts by weight of potassium persulfate (KPS) as a water-soluble polymerization initiator were added all together to proceed with the reaction. After aging for 2 hours, the reaction was completed to prepare polystyrene seed latex, with a polymerization conversion rate of 96%.
<Preparation of Core>
After preparing the emulsifying initiator latex, the internal temperature of the reactor was maintained at 70° C. Subsequently, a core forming monomer mixture of 49.35 parts by weight of butyl acrylate, 15 parts by weight of 2-ethylhexyl acrylate, 0.65 parts by weight of allyl methacrylate, 1 part by weight of a fatty acid soap as a surfactant, and 0.5 parts by weight of potassium persulfate as a water-soluble polymerization initiator was continuously added for 3 hours to proceed with the reaction. After completing the addition of the core forming monomer mixture, and aging for 2 hours, the reaction was completed to prepare core latex, with a polymerization conversion rate of 98%, and the core particles had an average particle diameter of 220 nm.
<Preparation of Core-Shell Copolymer>
After preparing the core latex, the internal temperature of the reactor was raised to 75° C. and maintained at this temperature. After the internal temperature of the reactor reached 75° C., a shell forming monomer mixture of 22.3 parts by weight of methyl methacrylate, 2.5 parts by weight of butyl acrylate, 0.2 parts by weight of ethylene glycol dimethacrylate, 0.5 part by weight of a fatty acid soap as a surfactant, and 0.2 parts by weight of potassium persulfate as a water-soluble initiator was continuously added for 2 hours to proceed with the reaction. After completing the addition of the shell forming monomer mixture, and aging for 1 hour and 30 minutes, the reaction was completed to prepare core-shell copolymer latex, with a polymerization conversion rate of 98%, and the core-shell copolymer particles had an average particle diameter of 241 nm.
<Preparation of Core-Shell Copolymer Powder>
To the obtained core-shell copolymer latex, 1 part by weight of an aqueous magnesium sulfate solution (at a concentration of 15%) based on 100 parts by weight of core-shell copolymer solid content was added all together as a coagulant to perform agglomeration, thereby obtaining slurry, which was washed with ion exchange water three times to wash off the byproduct, and filtration was performed to remove the washing water. Subsequently, drying was performed at 80° C. for 2 hours using a fluidized-bed dryer to obtain core-shell copolymer powder.

Comparative Example 2

The process was performed in the same manner as in Example 1, except that in the preparation of the emulsifying initiator, 0.7 parts by weight of styrene, 0.2 parts by weight of acrylic acid, 0.1 parts by weight of 2-t-butylperoxy-2-methyl-5-hexene-3-yne were added to prepare the emulsifying initiator, and in the preparation of the core, 58.30 parts by weight of butyl acrylate, and 0.7 parts by weight of allyl methacrylate were added.

Comparative Example 3

The process was performed in the same manner as in Example 1, except that in the preparation of emulsifying initiator, the polymerization temperature was maintained at 50° C., t-dodecylmercaptan as a molecular weight modifier was not added, and 0.005 parts by weight of potassium persulfate (KPS) as a water-soluble polymerization initiator were added.

Comparative Example 4

The process was performed in the same manner as in Example 1, except that in the preparation of the emulsifying initiator, 2 parts by weight of styrene, 4 parts by weight of acrylic acid, and 4 parts by weight of 2-t-butylperoxy-2-methyl-5-hexene-3-yne were added.

Comparative Example 5

The process was performed in the same manner as in Example 1, except that in the preparation of the emulsifying initiator, 9.5 parts by weight of styrene, 0.25 parts by weight of acrylic acid, and 0.25 parts by weight of 2-t-butylperoxy-2-methyl-5-hexene-3-yne were added.

Comparative Example 6

The process was performed in the same manner as in Example 1, except that in the preparation of the emulsifying initiator, 17.5 parts by weight of styrene, 5 parts by weight of acrylic acid, 2.5 parts by weight of 2-t-butylperoxy-2-methyl-5-hexene-3-yne were added to prepare the emulsifying initiator, and in the preparation of the core, 34.5 parts by weight of butyl acrylate, and 0.5 parts by weight of allyl methacrylate were added.

Comparative Example 7

The process was performed in the same manner as in Example 1, except that in the preparation of emulsifying initiator, the internal temperature of the reactor was adjusted to 90° C., and 0.8 parts by weight of t-dodecylmercaptan as a molecular weight modifier, and 1.2 parts by weight of potassium persulfate (KPS) as a water-soluble polymerization initiator were added all together to proceed with the reaction.

Experimental Example

Experimental Example 1

The weight average molecular weight and the critical micelle concentration of each emulsifying initiator prepared in Examples 1 to 4 and Comparative Examples 2 to 7 were measured by the method as described below, and the composition of each core-shell copolymer is shown in Tables 1 and 2 with the results.

Weight average molecular weight (Mw, g/mol): the emulsifying initiator was immersed in methanol and dried, then dissolved in a tetrahydrofuran (THF) solvent at a concentration of 0.2% by weight, and Mw was measured using gel permeation chromatography (GPC) equipment.

Critical micelle concentration (CMC, g/L): the CMC of the prepared emulsifying initiator was measured at room temperature (15° C. to 25° C.) by a Wilhelmy plate method, using a surface tension meter, tensiometer K12.

TABLE 1

| | Classification | Example | | | |
|---|---|---|---|---|---|
| | | 1 | 2 | 3 | 4 |
| Emulsifying initiator | SM[1] (part by weight) | 7 | 6.5 | 7 | 5 |
| | AA[2] (part by weight) | 2 | 2 | 2 | 3 |
| | BMH[3] (part by weight) | 1 | 1.5 | 1 | 2 |
| Core | BA[4] (part by weight) | 49.35 | 49.35 | 49.35 | 49.35 |
| | 2-EHA[5] (part by weight) | 15 | 15 | 15 | 15 |
| | AMA[6] (part by weight) | 0.65 | 0.65 | 0.65 | 0.65 |
| Shell | MMA[7] (part by weight) | 22.30 | 22.30 | — | 22.30 |
| | BA[4] (part by weight) | 2.5 | 2.5 | — | 2.5 |
| | SM[1] (part by weight) | — | — | 19.8 | — |
| | AN[8] (parts by weight) | — | — | 5.0 | — |
| | EGDMA[9] (parts by weight) | 0.20 | 0.20 | 0.20 | 0.20 |
| Total content of monomer (part by weight) | | 100 | 100 | 100 | 100 |
| Emulsifying initiator properties | Mw (g/mol) | 30,000 | 20,000 | 30,000 | 15,000 |
| | CMC (g/L) | 17 | 13 | 16 | 9 |

[1]SM: styrene
[2]AA: acrylic acid
[3]BMH: 2-t-butylperoxy-2-methyl-5-hexene-3-yne
[4]BA: butyl acrylate
[5]2-EHA: 2-ethylhexyl acrylate
[6]AMA: allyl methacrylate
[7]MMA: methyl methacrylate
[8]AN: acrylonitrile
[9]EGDMA: ethylene glycol dimethacrylate

TABLE 2

| | Classification | Comparative Example | | | | | | |
|---|---|---|---|---|---|---|---|---|
| | | 1 | 2 | 3 | 4 | 5 | 6 | 7 |
| Emulsifying initiator | SM[1] (part by weight) | 10 | 0.7 | 7 | 2 | 9.5 | 17.5 | 7 |
| | AA[2] (part by weight) | — | 0.2 | 2 | 4 | 0.25 | 5 | 2 |
| | BMH[3] (part by weight) | — | 0.1 | 1 | 4 | 0.25 | 2.5 | 1 |
| Core | BA[4] (part by weight) | 49.35 | 58.30 | 49.35 | 49.35 | 49.35 | 34.5 | 49.35 |
| | 2-EHA[5] (part by weight) | 15 | 15 | 15 | 15 | 15 | 15 | 15 |

TABLE 2-continued

| | Classification | Comparative Example | | | | | | |
| --- | --- | --- | --- | --- | --- | --- | --- | --- |
| | | 1 | 2 | 3 | 4 | 5 | 6 | 7 |
| Shell | AMA[6] (part by weight) | 0.65 | 0.70 | 0.65 | 0.65 | 0.65 | 0.5 | 0.65 |
| | MMA[7] (part by weight) | 22.30 | 22.30 | 22.30 | 22.30 | 22.30 | 22.30 | 22.30 |
| | BA[4] (part by weight) | 2.5 | 2.5 | 2.5 | 2.5 | 2.5 | 2.5 | 2.5 |
| | EGDMA[9] (parts by weight) | 0.20 | 0.20 | 0.20 | 0.20 | 0.20 | 0.20 | 0.20 |
| Total content of monomer (part by weight) | | 100 | 100 | 100 | 100 | 100 | 100 | 100 |
| Emulsifying initiator properties | Mw (g/mol) | — | 29,000 | 250,000 | 21,000 | 50,000 | 65,000 | 4,000 |
| | CMC (g/L) | — | 16 | 24 | 2.0 | 40 | 45 | 12 |

[1] SM: styrene
[2] AA: acrylic acid
[3] BMH: 2-t-butylperoxy-2-methyl-5-hexene-3-yne
[4] BA: butyl acrylate
[5] 2-EHA: 2-ethylhexyl acrylate
[6] AMA: allyl methacrylate
[7] MMA: methyl methacrylate
[9] EGDMA: ethylene glycol dimethacrylate Experimental Example 2

Based on 100 parts by weight of the total contents of the core-shell copolymer powder and the polycarbonate resin, 4 parts by weight of the core-shell copolymer or the polystyrene seed prepared in Examples 1 to 4, and Comparative Examples 1 to 7, and 96 parts by weight of a polycarbonate resin (available from LG-Dow, product name PC 1300-15) were mixed with 0.5 parts by weight of a processing additive as an additive and 0.02 parts by weight of a pigment, and then extruded under the condition of 200 rpm, a metering speed of 60 kg/hr, and a temperature of 250° C. to 320° C., using a twin screw extruder available from Leistritz, thereby obtaining a pellet. The obtained pellet was injected under the condition of a temperature of 250° C. to 320° C., using an EC100 (30 injection machine available from ENGEL, thereby preparing a specimen for evaluating physical properties, and then the physical properties were measured by the following method, and are shown in Tables 3 and 4.

Impact strength (Notched Izod Impact Strength, kgf·cm/cm): a specimen having a thickness of ⅛" having a notch formed thereon was used to measure impact strength at −30° C. and room temperature (15° C. to 25° C.) according to an ASTM D256 standard measurement, Method A.

Hydrolytic stability—impact strength variation and yellow index variation

1) Impact strength variation (room temperature AIzod IS): a specimen having a thickness of ⅛" with a notch formed thereon was aged for 500 hours under the condition of the internal temperature of 90° C. and the relative humidity of 95%, in the constant temperature and humidity chamber, and then impact strength was measured at room temperature (15° C. to 25° C.) according to an ASTM D256 standard measurement, Method A, and an impact strength variation (=impact strength after aging—impact strength before aging) was calculated.

2) Yellow index variation (ΔYI): the yellow index (YI) of a specimen having a thickness of ⅛" with a notch formed thereon was measured (yellow index before aging) at room temperature (15° C. to 25° C.), using a color difference meter, Hunterlab UltraScan Pro, the same specimen was aged for 500 hours under the conditions of the internal temperature of 90° C. and the relative humidity of 95% in the constant temperature and humidity chamber, and then the yellow index was measured at room temperature (15° C. to 25° C.) in the same manner, thereby calculating the yellow index (YI) variation (=yellow index after aging—yellow index before aging).

Thermal resistance—injection residence stability (ΔYI): the yellow index (yellow index of the specimen before residence) of a pellet specimen was measured at room temperature (15° C. to 25° C.), using a color difference meter, Hunterlab UltraScan Pro, the pellet specimen was allowed to reside at 330° C. for 10 minutes using an EC100 (30 injection machine available from ENGEL, and then the yellow index was measured at room temperature (15° C. to 25° C.) in the same manner, thereby calculating the yellow index variation (=yellow index of the specimen before residence—yellow index of the specimen after residence for 10 minutes).

Coloring property (LE): the CIE lab color values of pellet specimens were measured using the spectrophotometer, Color-eye 3100, and the color value difference was reflected based on the CIE lab color value of the control specimen prepared by extruding and injecting a resin composition which does not contain the impact modifier at the time or preparing the pellet, thereby calculating $\Delta E$ $(=[\Delta L^*_2+\Delta a^*_2+\Delta b^*_2]_{1/2})$ It represents that the lower the $\Delta E$, the better the coloring property, and the higher the $\Delta E$, the poorer the coloring property.

TABLE 3

| Classification | | Example | | | |
| --- | --- | --- | --- | --- | --- |
| | | 1 | 2 | 3 | 4 |
| Impact strength (kgf · cm/cm) | Room temperature | 65 | 63 | 60 | 66 |
| | −30° C. | 16 | 15 | 14 | 15 |

TABLE 3-continued

| Classification | | Example | | | |
|---|---|---|---|---|---|
| | | 1 | 2 | 3 | 4 |
| Hydrolytic stability | ΔIzod IS at room temperature | 12 | 11 | 13 | 14 |
| | ΔYI | 13 | 12 | 14 | 15 |
| Thermal resistance (Injection residence stability) | ΔYI | 8 | 9 | 10 | 9 |
| Coloring property | ΔE | 6 | 7 | 5 | 8 |

TABLE 4

| Classification | | Comparative Example | | | | | | |
|---|---|---|---|---|---|---|---|---|
| | | 1 | 2 | 3 | 4 | 5 | 6 | 7 |
| Impact strength (kgf · cm/cm) | Room temperature | 43 | 36 | 38 | 41 | 45 | 35 | 36 |
| | −30° C. | 9 | 6 | 7 | 6 | 8 | 5 | 7 |
| Hydrolytic stability | ΔIzod IS at room temperature | 35 | 40 | 38 | 37 | 29 | 25 | 28 |
| | ΔYI | 28 | 32 | 30 | 27 | 28 | 26 | 27 |
| Thermal resistance (Injection residence stability) | ΔYI | 26 | 31 | 28 | 25 | 27 | 28 | 29 |
| Coloring property | ΔE | 12 | 18 | 15 | 21 | 12 | 13 | 14 |

As shown in Tables 3 and 4, it was confirmed that Examples 1 to 4 using the core-shell copolymer polymerized using the emulsifying initiator in the thermoplastic resin composition had high impact strength both at room temperature and low temperature to have excellent impact resistance, significantly improved hydrolytic stability and thermal resistance, and an excellent coloring property, as compared with Comparative Example 1 using the polystyrene seed to polymerize the core-shell copolymer. However, it was confirmed that Comparative Example 2 using the emulsifying initiator but having a very low content of the emulsifying initiator in the core-shell copolymer, Comparative Example 6 having a high content of the emulsifying initiator in the core-shell copolymer, Comparative Example 3 including the same content of the emulsifying initiator but having a high weight average molecular weight of the emulsifying initiator, and Comparative Example 7 having a very low weight average molecular weight of the emulsifying initiator all had significantly decreased impact resistance, hydrolytic stability, thermal resistance and coloring property, even as Comparative Example 1.

In addition, it was confirmed that Comparative Example 4 having a low content of the vinyl monomer-derived repeating unit in the emulsifying initiator, and high contents of the surfactant part and the initiator part, and Comparative Example 5 having a high content of the vinyl monomer-derived repeating unit in the emulsifying initiator and low contents of the surfactant part and the initiator part all had significantly decreased impact resistance, hydrolytic stability, thermal resistance and coloring property, even as compared with Comparative Example 1.

From the above results, the present inventors confirmed that when according to the present invention, using the emulsifying initiator including the surfactant part, the initiator part, and the vinyl monomer-derived repeating unit in an appropriate range to prepare the core-shell copolymer, and using this core-shell copolymer in the thermoplastic resin composition, it is not necessary to add a polymerization initiator and a surfactant separately, thereby minimizing the content of the remaining polymerization initiator in the core-shell copolymer, and preventing the surfactant from remaining, and thus, the thermoplastic resin composition may have significantly improved impact resistance, coloring property, hydrolysis resistance and thermal stability, as compared with the thermoplastic resin composition including the core-shell copolymer using the conventional seed.

The invention claimed is:
1. A core-shell copolymer comprising:
a core including an emulsifying initiator-derived layer derived from an emulsifying initiator, and a core forming monomer-derived repeating unit, bound to the emulsifying initiator-derived layer, and
a shell including a shell forming monomer-derived repeating unit,
wherein a content of the emulsifying initiator-derived layer is 2% by weight to 20% by weight, a content of the core forming monomer-derived repeating unit is 40% by weight to 88% by weight, and a content of the shell forming monomer-derived repeating unit is 10% by weight to 40% by weight, based on a total content of the core-shell copolymer,
the emulsifying initiator comprising a surfactant part, an initiator part, and a vinyl monomer-derived repeating unit, the surfactant part including an organic acid-based monomer-derived repeating unit, and the initiator part including a peroxide-based monomer-derived repeating unit,
wherein a content of the organic acid-based monomer-derived repeating unit is more than 2.5% by weight and less than 40% by weight, a content of the peroxide-based monomer-derived repeating unit is more than 2.5% by weight and less than 40% by weight, and a content of the vinyl monomer-derived repeating unit is more than 20% by weight and less than 95% by weight, based on a total content of the emulsifying initiator, and
wherein the emulsifying initiator has a weight average molecular weight less than 250,000 g/mol.
2. The core-shell copolymer of claim 1, wherein the emulsifying initiator has a weight average molecular weight of 5,000 g/mol to 200,000 g/mol.
3. The core-shell copolymer of claim 1, wherein the emulsifying initiator has a critical micelle concentration of 0.1 g/L to 30 g/L.
4. The core-shell copolymer of claim 1, wherein the peroxide-based monomer is represented by the following Chemical Formula 1:

[Chemical Formula 1]

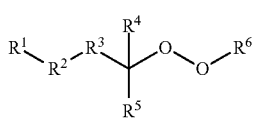

wherein
$R^1$ is an alkenyl group having 2 to 10 carbon atoms,
$R^2$ is an alkynylene group having 2 to 10 carbon atoms,
$R^3$ is a single bond or an alkylene group having 1 to 10 carbon atoms,
$R^4$ and $R^5$ are independently of each other an alkyl group having 1 to 30 carbon atoms, and
$R^6$ is hydrogen or an alkyl group having 1 to 10 carbon atoms.

5. The core-shell copolymer of claim 4, wherein the peroxide-based monomer is 2-tert-butylperoxy-2-methyl-5-hexene-3-yne, 5-hydroperoxy-5-methyl-l-hexene-3-yne, or a mixture thereof.

6. The core-shell copolymer of claim 1, wherein the core forming monomer includes an alkyl (meth)acrylate monomer and a crosslinkable monomer.

7. The core-shell copolymer of claim 1, wherein the shell forming monomer includes two or more monomers selected from the group consisting of an alkyl (meth)acrylate monomer, an aromatic vinyl monomer and a vinyl cyano monomer; and a cros slinkable monomer.

8. A method of preparing a core-shell copolymer, comprising:
   i) polymerizing an organic acid-based monomer, a peroxide-based monomer and a vinyl monomer to prepare an emulsifying initiator having a weight average molecular weight less than 250,000 g/mol (S1);
   ii) reacting a core forming monomer in situ in the presence of the inisurf emulsifying initiator prepared in (S1), thereby preparing a core polymer (S2); and
   iii) reacting a shell forming monomer in the presence of the core polymer prepared in (S2), thereby preparing the core-shell copolymer (S3),
   wherein a content of each monomer in (S1) is as follows: more than 2.5% by weight and less than 40% by weight of the organic acid-based monomer, more than 2.5% by weight and less than 40% by weight of the peroxide-based monomer, and more than 20% by weight and less than 40% by weight of the vinyl monomer, based on a total content of the emulsifying initiator, and
   contents of the emulsifying initiator, the core forming monomer and the shell forming monomer in (S2) and (S3) are as follows: 2% by weight to 20% by weight of the emulsifying initiator, 40% by weight to 88% by weight of the core forming monomer, and 10% by weight to 40% by weight of the shell forming monomer, based on a total content of the core-shell copolymer.

9. The method of claim 8, wherein in (S3), the shell forming monomer is graft polymerized in situ in the presence of the core polymer prepared in (S2).

10. A thermoplastic resin composition comprising the core-shell copolymer of claim 1 and a polycarbonate-based resin.

11. The thermoplastic resin composition of claim 10, wherein a content of the core-shell copolymer is 0.1% by weight to 50% by weight, and a content of the polycarbonate-based resin is 50% by weight to 99.9% by weight, based on thea total content of the thermoplastic resin composition.

12. The thermoplastic resin composition of claim 10, wherein the thermoplastic resin composition has impact strength at −30° C. of 10 kgf·cm/cm to 20 kgf·cm/cm, and impact strength at room temperature of 50 kgf·cm/cm or more, for a specimen having a thickness of ⅛", as measured according to an ASTM D256 standard measurement, Method A, wherein the room temperature being from 15° C. to 25° C.

* * * * *